Patented Dec. 15, 1931

1,836,859

UNITED STATES PATENT OFFICE

BERTRAM MAYER, KARL KRAUER, AND HUGO SIEBENBÜRGER, OF BASEL, SWITZERLAND, ASSIGNORS TO SOCIETY OF CHEMICAL INDUSTRY IN BASLE, OF BASEL, SWITZERLAND

VAT-DYESTUFFS AND INTERMEDIATE PRODUCTS AND PROCESS OF MAKING SAME

No Drawing. Application filed August 21, 1928, Serial No. 301,170, and in Switzerland September 9, 1927.

The present invention relates to the production of new vat-dyestuffs of the benzanthrone series and the intermediate products thereof. It comprises the process of making these products, the products themselves, and the material that has been dyed with the new dye stuffs.

The invention is based on the observation that the hitherto unknown sulfonic acids of benzanthrone can easily be made by treating a benzanthrone with oleum at atmospheric temperature. These new sulfonation products, which dissolve in sulfuric acid to solutions of characteristic color and fluorescence, dye wool greenish-yellow tints. Their main interest, however, resides in the fact that when treated with alkaline condensation agents, particularly with caustic alkalies at temperatures above 255° C., preferably between 260–310° C., they are converted into vat-dyestuffs which dye cotton grey to violet tints. The fastness properties of the new vat-dyestuffs are increased by alkylation with the alkyl esters of aromatic sulfonic acids. There are thus obtained vat-dyestuffs which form dark powders which are insoluble in water but soluble in sulfuric acid to a blue solution. They yield red-violet vats and dye textile goods of vegetable origin, such as cotton, fast grey-blue tints which are particularly fast to chlorine. The constitution of the new dyestuffs is unknown. They consist probably of products of the general formula

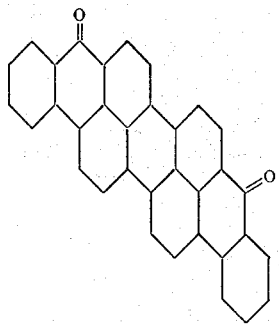

wherein 2 hydrogen atoms are replaced by two oxygen-alkyl residues.

The following examples illustrate the invention, the parts being by weight:—

Example 1

10 parts of benzanthrone of the formula

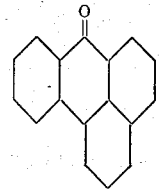

are dissolved in 100 parts of oleum of 12 per cent. strength, the solution is allowed to stand for some hours and then poured into a dilute solution of common salt; the precipitate thus formed is filtered by suction, and washed free from acid by means of a common salt solution. The benzanthrone-sulfonic acid thus obtained is, when dry, a yellow powder which dissolves in water to a yellow solution and in sulfuric acid to an orange solution having a green fluorescence. The product dyes wool greenish-yellow. The position of the sulfo-group is not known, the reaction probably proceeds according to the following equation:

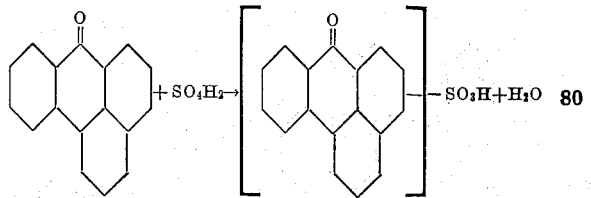

Example 2

Into 100 parts of caustic potash at 180° C. there are introduced, while stirring, 15 parts of the benzanthrone-sulfonic acid made as described in Example 1. The temperature is then raised to 270° C and the stirring continued for 1 hour at 270 to 300° C. After cooling, the mass is dissolved in water, the solution acidified and the precipitate thus produced filtered.

The dyestuff formed dissolves in sulfuric acid to a blue solution from which water precipitates greenish grey-blue flocks. The hydrosulfite vat is a red-violet with a brown-red fluorescence; it dyes cotton grey tints.

When the benzanthrone-sulfonic acid is melted with caustic potash with addition of alcohol a violet blue dyestuff is produced.

*Example 3*

5 parts of the dyestuff obtained as described in the first paragraph of the preceding example are heated to boiling for 4 hours with 10 parts of calcined sodium carbonate and 10 parts of para-toluene-sulfonic acid-methyl-ester in 150 parts of nitrobenzene. After cooling, the violet solution is filtered and the solid matter is treated with steam to free it from adhering solvent.

The methylated product dissolves in sulfuric acid to a blue solution. It dyes cotton in a red-violet vat grey-blue tints which are fast, particularly to chlorine the reaction probably proceeds according to the following equation:

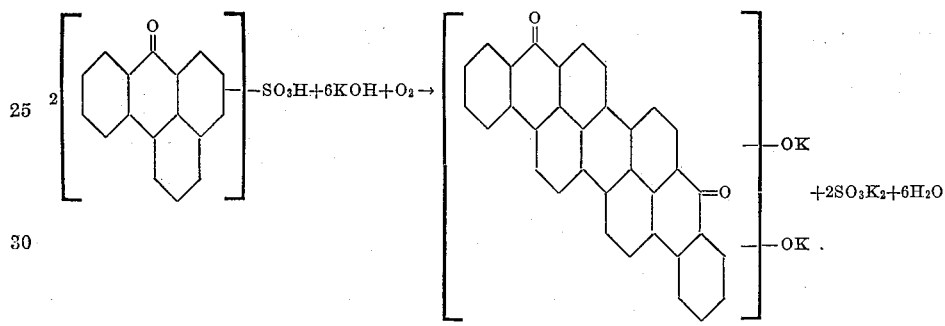

Similar products are obtained if the methyl-ester of para-toluene-sulfonic acid is replaced by the corresponding ethyl-ester or by the methyl-ester of another aromatic sulfonic acid, such as benzene-sulfonic acid the reaction probably proceeds according to the following equation:

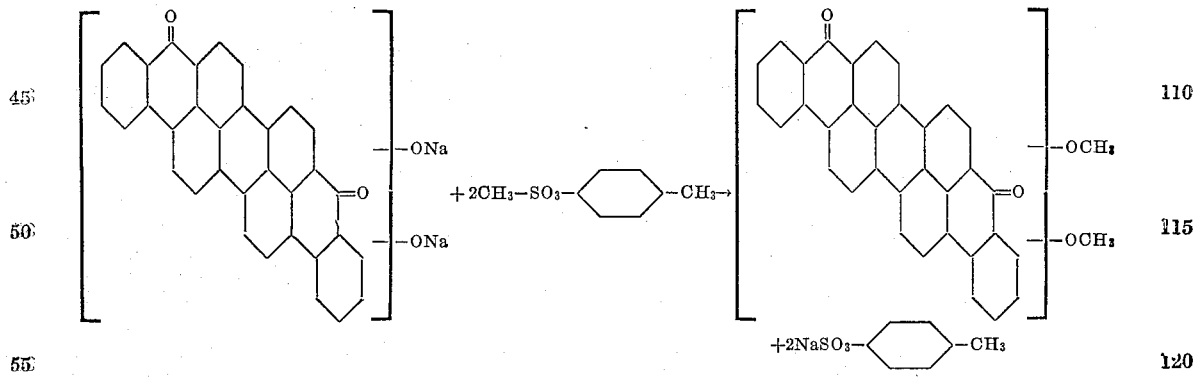

What we claim is:—

1. As new products the vat dyestuffs of the benzanthrone series which are obtained by treatment of a benzanthrone with oleum at atmospheric temperature, fusion of the sulfonic acids thus obtained with caustic alkalies at temperatures above 255° C. and alkylation of the vat-dyestuffs thus obtained with alkyl-esters of aromatic sulfonic acids, which products form dark powders insoluble in water but soluble in sulfuric acid to a blue solution, yielding red-violet vats and dyeing cotton grey-blue tints which are very fast, particularly fast to chlorine.

2. As new products the vat dyestuffs of the benzanthrone series which are obtained by treatment of benzanthrone with oleum at atmospheric temperature, fusion of the sulfonic acids thus obtained with caustic potash at temperatures between 260° and 310° C. and alkylation of the vat-dyestuffs thus obtained with the methyl-ester of the para-toluene-sulfonic acid, which products form dark powders insoluble in water but soluble in sulfuric acid to a blue solution, yielding red-violet vats and dyeing cotton grey-blue tints which are very fast, particularly fast to chlorine.

In witness whereof we have hereunto signed our names this 8th day of August 1928.

BERTRAM MAYER.
KARL KRAUER.
HUGO SIEBENBÜRGER.